Nov. 30, 1965   J. JOUIN   3,220,573
DEVICE FOR ADJUSTING THE POSITION OF ELEMENTS
IN A NUCLEAR REACTOR TANK
Filed March 27, 1963   4 Sheets-Sheet 1

INVENTOR.
JACQUES JOUIN
BY
Bacon & Thomas
ATTORNEYS

Nov. 30, 1965 J. JOUIN 3,220,573
DEVICE FOR ADJUSTING THE POSITION OF ELEMENTS
IN A NUCLEAR REACTOR TANK
Filed March 27, 1963 4 Sheets-Sheet 4

INVENTOR.
JACQUES JOUIN
BY
Bacon & Thomas
ATTORNEYS

United States Patent Office 3,220,573
Patented Nov. 30, 1965

3,220,573
DEVICE FOR ADJUSTING THE POSITION OF ELEMENTS IN A NUCLEAR REACTOR TANK
Jacques Jouin, Chaville, France, assignor to Commissariat a l'Énergie Atomique, Paris, France
Filed Mar. 27, 1963, Ser. No. 268,247
Claims priority, application France, Apr. 13, 1962, 894,485
7 Claims. (Cl. 214—18)

The invention relates to a device for adjusting the position of elements in a nuclear reactor tank and, more especially, a device which makes it possible to place in position a series of fuel elements according to the nodes of a lattice having a variable pitch, whether square, rectangular or triangular, inside the tank of a swimming-pool reactor.

A simple means of modifying the neutron-flux characteristics of nuclear reactors consists in modifying the arrangement of fuel elements and especially the spacing of said elements. The expedients employed up to the present time, however, had the disadvantage of excluding the possibility of constructing lattices having a pitch which could be varied according to requirements.

One expedient which has already been employed in swimming-pool reactors for the purpose of modifying the arrangement of the fuel elements consisted of a series of supports each carrying a group of elements and capable of being moved either close to or away from the center of the tank around which said fuel elements were disposed. It is wholly apparent that this solution does not permit of direct determination of the action of the pitch on the parameters of the reactor, inasmuch as the arrangement employed, while symmetrical, does not permit the positioning of each fuel element independently.

Another expedient which has previously been adopted consists in suspending the fuel elements from a series of stirrup members slidably mounted on parallel rods and in providing a first link-diamond system for the purpose of controlling the spacing of the rods relative to each other and another system for controlling the spacing between the stirrup members on the rods. However, this system is cumbersome, readily acquires play and does not make it possible to establish a different pitch in different regions of a swimming-pool reactor tank.

The present invention is directed to the design of a simple device for the position-adjustment of elements which permits the possibility of arranging said elements in a uniform lattice, whether square, rectangular or triangular, with any pitch desired.

The invention proposes a device for the position-adjustment of elements and especially of fuel elements or reflector elements inside a nuclear reactor tank, said device comprising a frame with four sides and having opposite sides parallel, a series of cross-members at right angles to two first opposite sides of the frame on which said cross-members rest through the intermediary of first means which permit the displacement of said cross-members in parallel relation to said first sides and stirrups supporting said elements and adapted to move along said cross-members, characterized in that said device comprises, mounted on each cross-member, at least one abutment member which is made fast for translational motion with said cross-member, said abutment member being made fast for rotation with a common driving shaft mounted at right angles to said cross-members and provided with a projecting part, said projecting parts having different orientations according to the cross-members and a trolley which is adapted to move at right angles to the cross-members by means of a first operating device, said trolley being brought into abutment with said projecting parts and caused to drive the corresponding cross-members according to the predetermined orientation of said projecting parts which has been established by means of said shaft.

The invention further consists in a certain number of other arrangements which can effectively be employed in conjunction with the previous arrangement but which can be also employed independently of this latter.

The invention will be more clearly understood from a perusal of the following description of one particular form of embodiment which is given by way of example and not in any sense by way of limitation. Reference is made in the description to the accompanying drawings, in which:

FIG. 3 shows the end portion of a cross-member and of the frame looking on the side, this view being taken in cross-section along the line 3—3 of FIGS. 1 and 2a;

*Structural arrangement*

Figure 1:
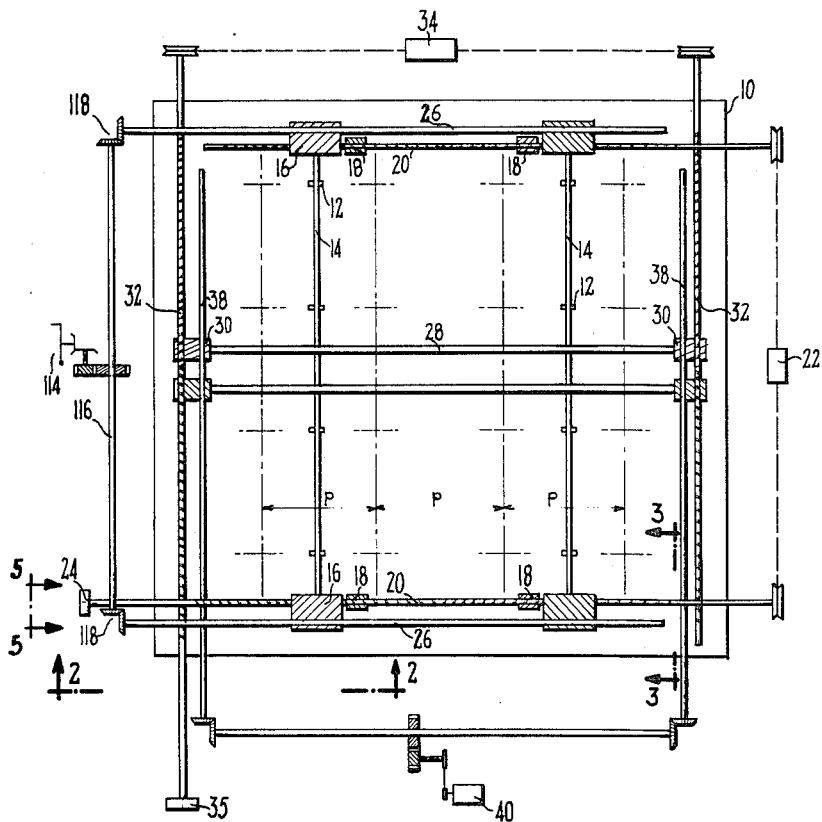
FIG. 1 is a general arrangement diagram of a device in accordance with the invention as seen from above.

The complete device in accordance with the invention as represented diagrammatically in FIG. 1 is enclosed in a sealed casing 10 through which are brought out only those components which serve for the control and position-setting of the device. The said sealed casing forms a rigid frame and the sides thereof provide roller tracks, the function of which will be explained in greater detail below.

For the sake of ensuring greater clarity of the description which follows below, two sides of the frame will be considered as having a north to south orientation (namely the vertical sides in FIG. 1), the other two sides being accordingly considered as having an east to west orientation (namely the horizontal sides in FIG. 1). The device makes it possible to displace each fuel element 12 along rectangular co-ordinates. Accordingly, each fuel element 12 can be displaced in the north-south direction along a cross-member 14; on the other hand, each cross-member 14 can be displaced in the east-west direction relative to the frame; for the sake of clarity of the drawings, only two cross-members have been shown in FIG. 1; the indications in chain-dotted lines illustrate diagrammatically a complete lattice with square pitch.

*Device for operating the cross-members*

Figure 2:
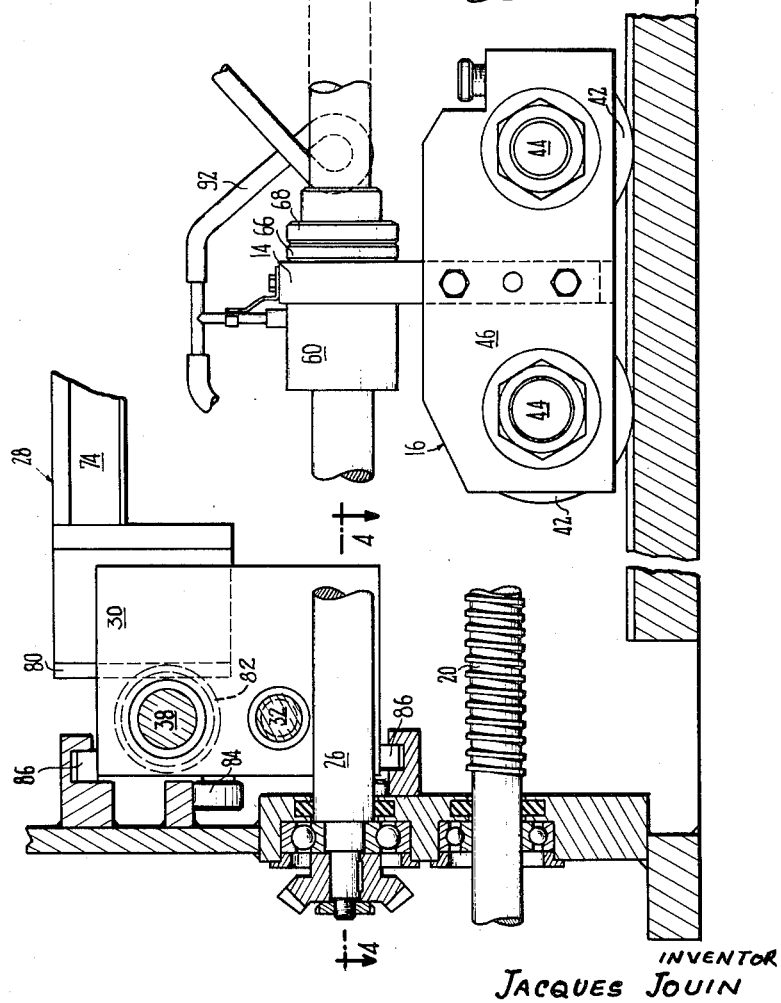
FIG. 2a shows the central portion of the device, looking on the side along the line 2—2 of FIGS. 1 and 4, this view being taken partly in cross-section.
FIG. 2b shows the end portion of the device, this view being taken partly in cross-section, looking on the side along the line 2—2 of FIGS. 1 and 4.

The device for operating the cross-members is shown in FIGS. 1 and 2. Each cross-member 14 (as shown in FIG. 1) is fitted with two carrier trolleys 16 which run on rails in an east-west direction, the said rails being made integral with the frame. The cross-members are actuated by two driving carriages 18, said carriages being driven in translational motion by means of two lead-screws 20 which also have an east-west orientation. A first mechanism which is diagrammatically illustrated in FIG. 1 drives the lead-screws in rotation. The said mechanism comprises a reduction-gear motor 22 which drives simultaneously the two lead-screws 20, one of which is fitted with a position-setting mechanism 24 which will be described below.

The driving carriage 18 can be brought into engagement on any one of the cross-members which can be selected by means of a device which will be described below so as to move said cross-member in the east-west direction. The selection is carried out by means of a selecting shaft 26 which passes through all the cross-members and is free to rotate and to slide in said cross-members.

Reference has so far been made in the description only to a single driving carriage 18 which is actuated by means of a lead-screw 20. In fact, it is preferable to make use of the arrangement of FIG. 1 in which provision is made for two carriages mounted symmetrically on two half-sections of the lead-screw 20 which are provided with screw-threads of equal but opposite pitch. It is accordingly possible to place in position two cross-members at the same time while nevertheless ensuring perfect symmetry of the combined assembly.

*Device for controlling the displacement of fuel elements*

The foregoing description of the device for operating the cross-members will now be followed by a description of the device for controlling the displacement of the fuel elements along the cross-members, reference being had to FIG. 1. This device comprises a comb 28 having an east-west orientation and adapted to move in the north-south direction. The said comb is carried by two carrying and driving trolleys 30 which are actuated by two lead-screws 32 of north-south orientation which are driven simultaneously from a reduction-gear motor 34; one of the lead-screws is preferably fitted with a position-setting mechanism 35.

The comb is fitted with gripping means designed to displace the stirrups 76 from which the fuel elements are suspended. A selecting device operated by a rotary rod 38 makes it possible to withdraw the gripping members in such manner as to select one row of stirrups in preference to another.

In this case also, two combs can advantageously be provided and operated simultaneously by means of two half-sections of opposite pitch of the lead-screws 32. The gripping means of the two combs are armed and withdrawn at the same time by means of a reduction-gear motor 40.

Figure 3:
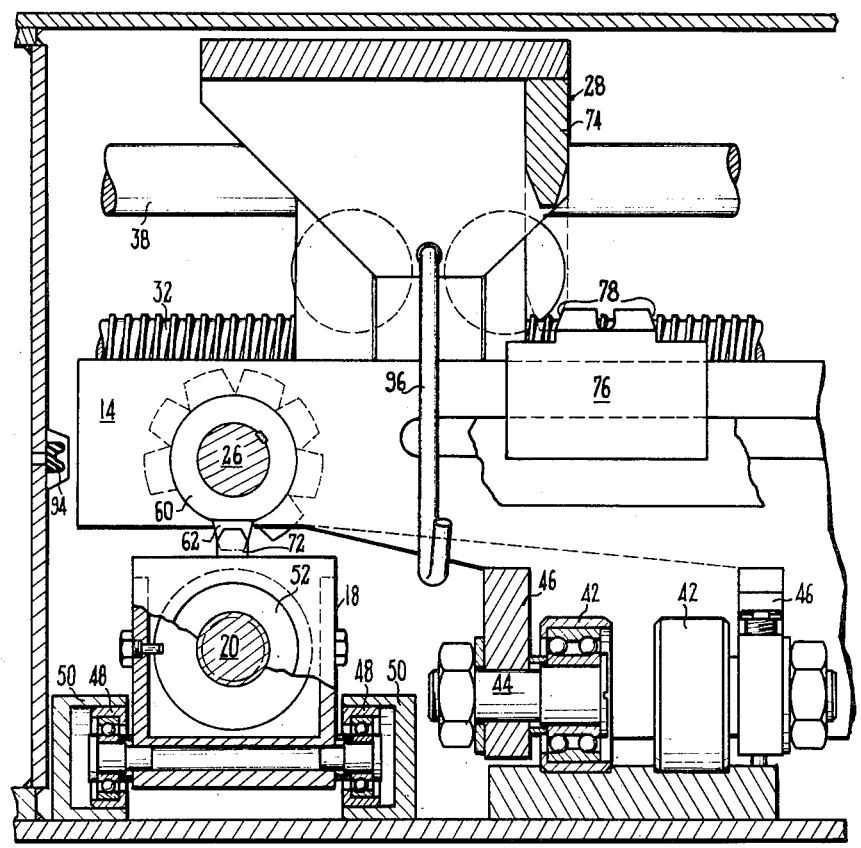
Figure 4:
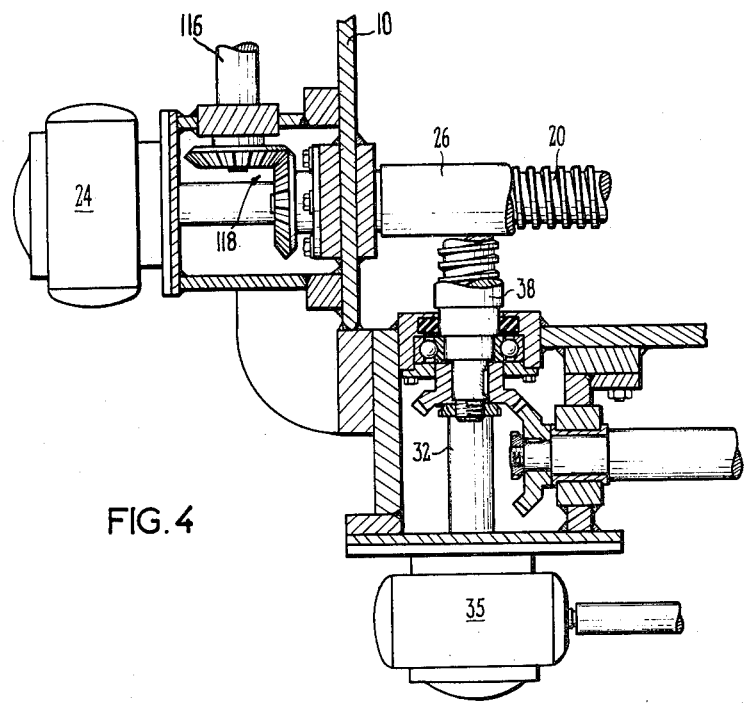
FIG. 4 is a view of the device taken in horizontal cross-section along the line 4—4 of FIG. 2b.

The mechanisms which are diagrammatically illustrated in FIG. 1 are represented in detail in FIGS. 2 to 4. The elements of the cross-member operating device are shown in FIG. 2a and FIG. 3. Accordingly, the carrier trolley 16 (as shown in FIG. 1) is provided with four rollers 42 mounted on axle-pins 44 which are secured to plates 46 of the cross-member 14 and which run on the frame. The driving carriage 18 is also fitted with four rollers 48 which run in rails 50 (as shown in FIG. 3), said rails being secured to the frame. The carriage 18 is coupled to the lead-screw 20 by means of a nut 52 which is pivotally mounted inside the carriage in order to prevent any danger of jamming. The two half-sections of the lead-screw 20 are joined together at the center of the frame by means of a ring 54 which is centered in a stationary supporting-block by means of thrust-bearings 58 (as shown in FIG. 2a).

The end portion of each cross-beam 14 carries a driving sleeve 60 which can be oriented by means of the shaft 26 with a view to selecting that cross-member which is to be actuated by the driving carriage 18. A lug 62 is secured to each sleeve 60, for example by means of screws 64 (as shown in FIG. 2a).

Each sleeve 60 is made fast for translational motion with the corresponding cross-member 14, for example by means of a nut 66 and a lock-nut 68 which are screwed onto the end portion of the sleeve (as shown in FIG. 2a). Each sleeve is made fast for rotation with the driving shaft 26 by means of a sliding key system which has not been illustrated in the drawings. The driving shaft 26 is preferably formed of two parts which are assembled together in the central plane of the tank by means of a ring 70 which is guided by the supporting-block 56 (as shown in FIG. 2a).

The lugs 62 which are associated with the successive cross-members are displaced angularly with respect to each other through a constant angle (as shown in FIG. 3). For a given orientation of the shaft 26, only that lug 62 which is vertical is placed on the path of a driving nose 72 which is carried by the driving carriage.

The components of the device for controlling the displacement of the fuel elements are illustrated in FIGS. 2b and 3. The comb proper 28 is carried by two trolleys 30 which effect the displacement of said comb in the north-south direction. The said comb can assume relative to the trolleys 30 an upper position (as shown in full lines) and a lower position (as shown in broken lines). In the first position, a vertical blade 74 of the comb is designed to sweep the entire path thereof without coming into abutment with the stirrups 76 which carry the elements to be displaced. In the lower position, the blade 74 engages inside a recess 78 which is formed for this purpose in the stirrups 76 which are adapted to move along the cross-members and which support the fuel elements (not shown).

The mechanism for lifting and lowering the blade can be of any appropriate type. The mechanism which is illustrated by way of example is constituted by a rack 80 which is carried by each end vertical member of the comb and which meshes with a pinion 82 carried by the trolley 30 (as shown in FIG. 2b). The said pinion 82 is slidably keyed onto the operating rod 38 and the rotation of said rod accordingly permits the lifting or lowering of the blade.

The trolley 30 is displaced by means of the lead-screw 32 in conventional manner and is locked in position by the engagement of the rollers 84 and lugs 86 provided on said trolley in rails which are disposed along those sides of the frame which are oriented in a north-south direction (as shown in FIG. 2b).

As is the case with the lead-screw 20 and the shaft 26, the lead-screw 32 and rod 38 are advantageously constituted by two components which are joined together in the central plane of the frame.

When finally in position, the different elements are immobilized by means of an appropriate device. The device as illustrated in the drawings makes use of inflatable joints. When once they have been correctly oriented, the sleeves 60 are secured against further motion by means of inflatable joints 90 during the displacement of the cross-members by means of the carriage 18; the said joints, one of which is represented diagrammatically in FIG. 2a are fed through flexible pipes 92. Similarly, when once the cross-members are in position, said cross-members are secured against further motion by means of sealing joints 94 (as shown in FIG. 3). The stirrups 76 can also be locked by means of joints (not shown) which are fed through a flexible pipe 96.

Figure 5:
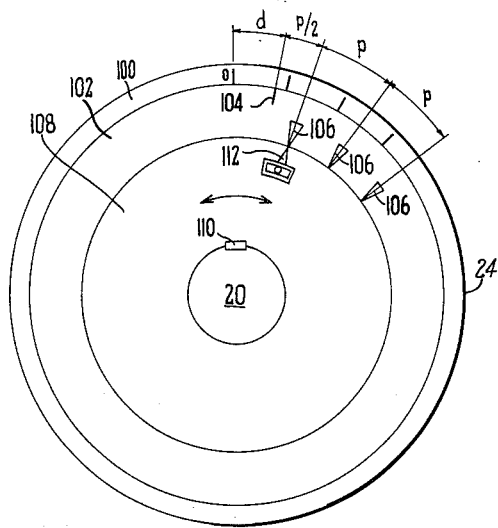
FIG. 5 is a general arrangement diagram which is intended to illustrate the operation of the device, this view being taken along the line 5—5 of FIG. 1.

The mechanism 24 for setting the cross-members in position is illustrated in FIGS. 4 and 5. This device, which is associated with a conventional circuit arrangement comprising relays and contactors designed to control the operation of the reduction-gear motor 22, effects the semi-automatic positioning of the cross-members. Said device 24 consists of three concentric rings which are capable of rotating relative to each other. The outer ring 100 is secured to the frame and is provided with a graduated scale starting from the point of origin O which materializes the central plane of the tank. The ring is preferably provided with a distance scale which corresponds to the spacings starting from the central plane of the tank.

The center ring 102 is adjustable inside the ring 100. Said center ring is provided with a reference mark 104 which materializes the center of the lattice and a series of cams 106 which materialize the position in which the cross-members are to be set. The cams can be displaced on the ring in such manner as to modify the lattice pitch.

The inner ring 108 is rigidly secured to the lead-screw 20 and is keyed thereto, for example, at 110. Said ring is fitted with a micro-contact breaker 112 which is actuated by the cams of the adjustable ring 102; when actuated by a cam, said micro-contact breaker energizes a relay which interrupts the supply of current to the reduction-gear motor 22 and accordingly immobilizes the cross-members. An interlocking system prevents the motor from starting up again as long as the selecting shafts 26 have not been subjected to a rotational movement which brings the lug of the following cross-member into the position of engagement.

The position-setting mechanism 24 and related circuits are located outside the sealed casing 10 as well as the similar mechanism 35; the reduction-gear motors and supply cables are also placed outside the casing, thereby avoiding the need to provide for electrical lead-in bushings. Only the lead-screws 20 and 32, the shaft 26 and the rod 38 pass through the casing and consequently have to be fitted with rotary seals.

The casing can be fitted with inspection windows through which the position of the carriages of the comb and of the cross-members relatively to graduated rules can be controlled visually.

*Method of operation*

The operation of the device will be described in the simple case of four cross-members each carrying four fuel elements which have to be brought into the positions shown in chain-dotted lines in FIG. 1.

The positioning described corresponds to the initial conditions in which the cross-members abut against each other in the central portion of the tank, and the stirrups are in that position which is nearest the center.

The first step consists in the positioning of the cross-members. Before any movement or displacement takes place, the position-setting mechanism 24 is first set so as to obtain the desired arrangement of the cross-members. The cams 106 are set around the central ring 102 at intervals which correspond to the pitch $p$ (as shown in FIG. 1) and the cam which is nearest the point of origin 104, namely the center of the tank, is obviously distant therefrom by an interval which corresponds to $p/2$. The center ring is then displaced relative to the point of origin O of the stationary ring through an angle which corresponds to the displacement $d$ between the driving carriage and the cross-member, said angular displacement being reversed with the direction in which the cross-members are displaced by the carriages.

When once the position-setting operation has been completed, the positioning proper is then performed. The sleeves 60 of the inner cross-members are brought into that orientation in which the lug 62 of said sleeves is located on the path of the nose 72 of the driving carriage 18. This orientation is effected simultaneously by means of a single selecting hand-wheel 114 which is coupled to a shaft 116, said shaft 116 being designed to drive the shafts 26 by means of bevel-gear couplings 118 located outside the casing 10 (as shown in FIGS. 1 and 4). When once this operation has been completed, the lugs 62 take up the position shown in FIG. 2a.

The driving carriages 18 are then actuated from the reduction-gear motor 22 by means of the lead-screws 20. The sets of cross-members which are located on each side of the central plane accordingly withdraw together; at the same time, the inner ring 108 of the position-setting mechanism 24 rotates; as soon as the ring reaches the angular position which is shown in FIG. 5, the micro-contact breaker 112 is closed by the cam 106 and causes the reduction-gear motor 22 to stop. The inner cross-members are then in position.

In order to place in position the two following cross-members, the shafts 26 are re-oriented by means of the hand-wheel 114. The reduction-gear motor 22 which had hitherto been immobilized is then permitted to start up again by means of an electrical or mechanical engagement system which has not been illustrated in the drawings. The motor stops as soon as the following cam 106 actuates the micro-contact breaker 112. The process is repeated in this manner until all the cross-members are in position.

An end of travel micro-contact breaker (which has not been shown in the drawings) can be mounted on the inner ring 108 for the purpose of stopping the reduction-gear motor prior to the mechanical abutment of the trolleys or cross-members against the ends of their rails.

When the cross-members 14 are in position and immobilized by the inflatable joints 94, the second step of the position-setting process consists in the positioning of the stirrups which carry the fuel elements along the cross-members. The operation is similar to the preceding and is carried out on two rows of fuel elements at the same time.

The trolleys 30 are first moved so as to bring the combs opposite the inner row of stirrups, the blades 74 being lifted for this operation. The said blades 74 are then lowered into their recesses 78 by means of the reduction-gear motor 40 which drives the rods 38 through the intermediary of bevel-gear couplings which are located outside the sealed casing 10.

The positioning of the inner rows of stirrups is then performed. Accordingly, the lead-screws 32 which are driven in rotation by the reduction-gear motor 32 displace the inner rows of stirrups away from each other while pushing back if necessary the other rows. The position-setting device 35, which is similar to the device 24, permits of accurate positioning.

When the two inner rows are in position, the blades 74 are lifted and the trolleys 30 are moved up to a new position in which the combs drive the following rows of stirrups; the preceding operation is repeated in order to place the second row in position and so forth if necessary until all the elements have been put in position.

It is thus possible to place the fuel elements in position according to the nodes of a lattice having either a square pitch or a rectangular pitch. It is also possible by removing one fuel element out of two, with all the stirrups remaining in position, to achieve a triangular pitch; the vacant stirrups must obviously be arranged in staggered relation on two adjacent cross-members.

What we claim is:

1. A device for adjustably positioning fuel elements, reflector elements, or the like inside a nuclear reactor tank, comprising: a frame including two pairs of opposed, parallel sides; a plurality of cross-members disposed transversely across said frame between one of said pairs of sides and at right angles with respect thereto; means for mounting said cross-members on said frame for longitudinal movement with respect to said one pair of sides; a plurality of element-supporting stirrups mounted on each of said cross-members for movement longitudinally with respect thereto; an abutment member mounted on each of said cross-members and having a projecting part; a common drive shaft slidably keyed to said abutment members for rotation of said abutment members to move the respective projecting parts thereof successively into an operative position; and a trolley member moveable at right angles with respect to said cross-members to selectively engage only the ones of said projecting parts which are in operative position and to thereby drive the corresponding cross-members longitudinally with respect to said one pair of sides.

2. A device as defined in claim 1 including comb means extending across said frame at right angles with respect to said cross-members, said comb means being selectively moveable between an operative position engageable with said stirrups and an inoperative position not engageable therewith, and trolley means mounting said comb means for transverse movement whereby movement of said trolley means selectively effects movement of said stirrups when said comb means is in operative position.

3. A device as defined in claim 2 wherein said nuclear reactor tank comprises a sealed tank, and wherein said trolley member and said trolley means are both operated by lead screws projecting through said casing and coupled to a driving motor positioned outside of said casing.

4. A device as defined in claim 1 wherein a trolley member is provided adjacent each one side of said one pair of sides and said trolley members are operated by a pair of lead screws mounted in parallel relation along the respective sides of said frame, each of said lead screws comprising two sections of opposite pitch, each said sections mounting a separate trolley member for actuation of two of said cross-members simultaneously.

5. A device as defined in claim 2 wherein said comb means comprises at least one comb member mounted at its opposite ends on carriages, said carriages being operated by lead screws for movement of said comb member at right angles with respect to said cross-members, and means for displacing said comb members in a vertical direction between said operative and said inoperative positions for selectively engaging and driving said stirrups.

6. A device as defined in claim 1 including means for automatically actuating said trolley members for movement of said cross-members to a selective position.

7. A device as defined in cyaim 6 wherein said last mentioned means comprises a first adjustable ring and a second ring carried by one of said lead screws, relative rotation of said second ring with respect to said first ring determining the selected position of movement of said cross-members.

References Cited by the Examiner
UNITED STATES PATENTS
3,070,531  12/1962  Huet _____ 176—28
FOREIGN PATENTS
890,330  2/1962  Great Britain.

GERALD M. FORLENZA, *Primary Examiner.*

HUGO O. SCHULZ, *Examiner.*